April 27, 1926.

P. C. ELLIOTT 1,582,253

LUBRICATING SYSTEM

Filed Sept. 15, 1921

Inventor
PAUL C. ELLIOTT.

Attorney

Patented Apr. 27, 1926.

UNITED STATES PATENT OFFICE.

PAUL C. ELLIOTT, OF DAYTON, OHIO.

LUBRICATING SYSTEM.

Application filed September 15, 1921. Serial No. 500,910.

*To all whom it may concern:*

Be it known that I, PAUL C. ELLIOTT, a citizen of the United States, residing at Dayton, in the county of Montgomery and State of Ohio, have invented certain new and useful Improvements in Lubricating Systems, of which the following is a specification, reference being had therein to the accompanying drawing.

This invention relates to lubricating systems for automobiles and more particularly to a device for automatically controlling the flow of oil from the pump to the bearings of an automobile engine or the like.

The pumps which form parts of the pressure lubricating systems of automobile engines and the like are usually operated from the engine shaft and the speed at which the pump operates is in direct ratio to the speed at which the engine is moving. The speed of the engine is not a true indication of the load on the bearings because when an automobile is moving over a straight, smooth stretch of road the engine may be operating at a very high rate of speed but under a relatively light load. On the other hand when climbing a grade the engine may be operating at a comparatively low speed but the bearings will be under a very heavy load. Consequently, a pump controlled wholly by the speed of the engine does not provide a proper distribution of oil to the bearings at all times.

One object of the present invention is to provide a device by means of which the flow of oil from the pump to the bearings will be controlled by the load on the bearings.

To this end it is a further object of the invention to provide a device to control the flow of oil from the pump to the bearings, which will be controlled by the suction in the intake manifold, which suction increases and decreases as the load on the bearing increases and decreases.

A further object of the invention is to provide a device of this kind which will be simple in its construction and operation, which can be easily attached to the engine and which can be produced at a relatively low cost.

Other objects of the invention will appear as the device is described in detail.

Figure 1:
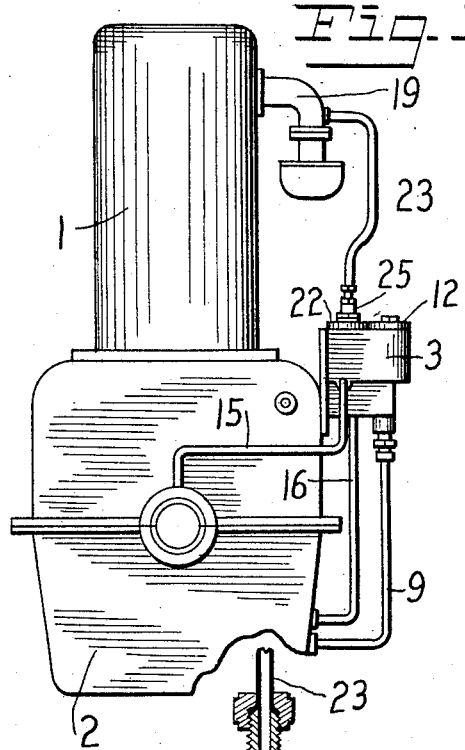
Figure 3:
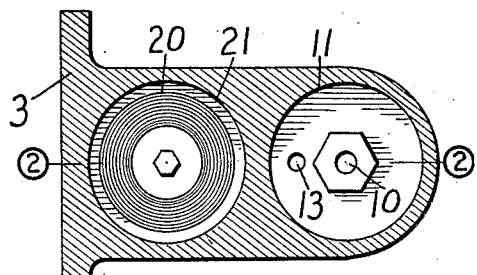
Figure 4:
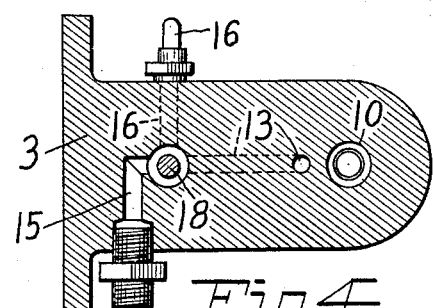
Figure 2:
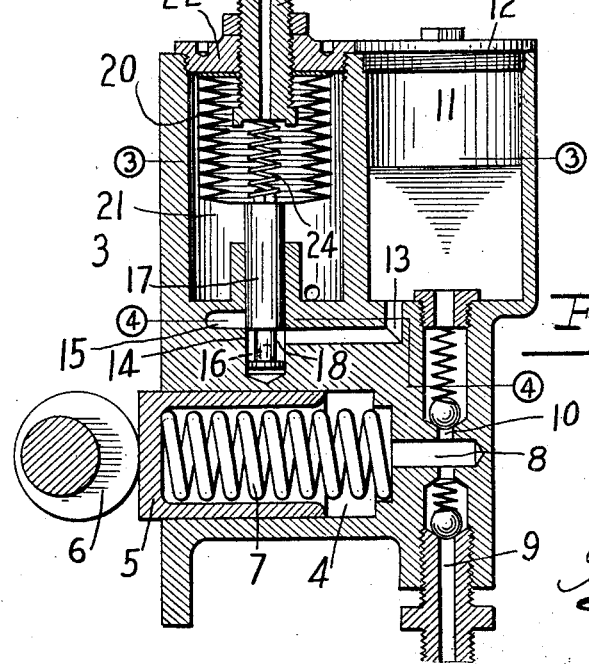

In the accompanying drawings Fig. 1 is an end elevation of an automobile engine, partly broken away, showing my invention applied thereto; Fig. 2 is a vertical sectional view taken through the controlling device on the line 2—2 of Fig. 3; Fig. 3 is a section taken on the line 3—3 of Fig. 2; and Fig. 4 is a top plan view of the controlling device.

In these drawings I have illustrated one embodiment of my invention and have shown the same as applied to an automobile engine 1 having the usual crank case 2 provided with a sump, or a well, from which the oil is pumped to the bearings and to which it returns after passing over the bearings. It will be understood, of course, that the invention may be applied to internal combustion engines of various kinds and that it may take various forms, the present embodiment having been chosen for the purpose of illustration only.

In the present construction I have shown the controlling device and pump as built into a single structure or unit. To this end I have provided a main frame, which, in the present instance, is in the form of a block, or casting, 3 and which carries a pump, the cylinder 4 of the pump being shown as formed in the body of the casting 3. Mounted in the cylinder is a piston 5 which is acted upon by a cam 6, which moves it in one direction, and a spring 7 which moves it in the opposite direction. This cylinder is provided with a port 8 which communicates with a valve controlled conduit 9 leading to a suitable source of oil supply, such as the sump in the crank case. The port 8 also communicates with a second valve controlled conduit 10 which leads to the bearings. The controlling device is interposed between the conduit 10 and the bearings. As here shown, the conduit 10 opens into an oil chamber 11 tightly closed at its upper end by a cap 12 and having at its bottom an outlet port 13 which leads to a distributing chamber 14. Leading from the distributing chamber 14 at a point slightly above the level of the port 13 is a conduit 15 which carries the oil to the bearings. Leading from the distributing chamber 14 slightly below the level of the port 13 is a second pipe 16 which leads back to the source of supply, or sump. Mounted in the distributing chamber, which is preferably in the form of a cylinder, is a plunger, or valve member, 17 provided near its lower end with a circumferential groove, or channel, 18. When the engine is operating under no load, or a very light load, the plunger will be in its lowermost position and the channel 18 will be in open communication with the port 13 and the lower pipe, or by-pass, 16, but will be out of communication with the pipe 15 leading to the bearings. Consequently, any oil that is forced through the distributing system will not reach the bearings but will be passed back to the sump. As the load on the bearings increases the plunger 17 is actuated to gradually interrupt the connection between the port 13 and the by-pass 16 and to gradually establish a connection between the port 13 and the pipe 15, leading to the bearings, thus increasing the flow of oil to the bearings as the load on the latter increases.

The position of the plunger 17 is preferably controlled by the suction in the intake manifold 19 of the engine and to this end I have shown the upper end of the plunger as connected with a suitable suction operated device, which is preferably in the form of a sylphon 20, that is, a bellows-like metallic structure, the closed end of which will move toward the opposite end thereof when its interior is subjected to suction. As here shown, the sylphon is mounted within a chamber 21 in the main frame, or casting, 3 and is tightly secured at its open, or upper, end to a cap 22 which closes the upper end of the chamber 21. A conduit, or pipe, 23 connects the interior of the sylphon with the intake manifold of the engine, and consequently, the sylphon will be subjected to the suction in the intake manifold and the plunger moved in accordance with the amount of that suction. Preferably a spring 24 acts upon the bottom wall of the sylphon and the plunger to resist the upward movement thereof and by regulating the tension of this spring the amount of movement imparted to the plunger by a given suction in the manifold may be varied. As here shown, the upper end of the spring bears against the screw threaded stem 25 mounted in the cap 22 and having a longitudinal bore with which the pipe 23 communicates. By adjusting the stem 25 in the cap the tension of the spring 24 may be varied, the pipe 23 having sufficient flexibility to permit of this adjustment.

The operation of the device will be readily understood from the foregoing description and it will be apparent that the oil is pumped from the sump or other source of supply to a distributing chamber and that its distribution from the chamber to the bearings or to the by-pass is controlled by the suction operated plunger 17 and that the flow of oil to the bearings is, therefore, controlled directly by the suction in the intake manifold, which is indicative of the load on the bearings. The chamber 11 is merely an equalizing chamber to maintain an even flow of oil to the distributing chamber and is not a necessary part of the device as the conduit 10 may lead directly to the distributing chamber. Where the equalizing chamber is employed it will be observed that the closure 12 is practically air tight and that as the oil is pumped into the chamber the air will be compressed therein above the oil and this air pressure will maintain an even flow of oil through the port 13.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. The combination with an internal combustion engine comprising a crank case, adapted to contain oil, and an intake manifold, and a pump connected with said crank case, of a controlling device comprising a distributing chamber having an inlet and outlets arranged on the respective sides of said inlet, said inlet being connected with said pump, one of said outlets being connected with the bearings to be oiled and the other of said outlets being connected with a by-pass, a valve mounted in said distributing chamber, held normally in a position to connect said inlet with one of said outlets, and a suction operated device connected with the intake manifold of said engine and acting on said valve to interrupt the communication between said inlet and the one outlet and establish communication between said inlet and the other outlet, said controlling device further comprising an equalizing chamber interposed between said pump and said distributing chamber.

2. The combination with an internal combustion engine comprising a crank case, adapted to contain oil, and an intake manifold, and a pump connected with said crank case, of a controlling device comprising a distributing chamber having an inlet and outlets arranged on the respective sides of said inlet, said inlet being connected with said pump, one of said outlets being connected with the bearings to be oiled and the other of said outlets being connected with a by-pass, a plunger slidably mounted in said chamber, having a groove arranged to communicate with said inlet in all positions thereof and to connect said inlet with one of said outlets when said plunger is in one position and to connect said inlet with another of said outlets when the plunger is in another position, and a suction operated device communicating with the intake manifold of said engine and connected with said plunger to impart sliding movement thereto.

3. The combination with an internal combustion engine comprising a crank case, adapted to contain oil and an intake manifold, and a pump connected with said crank case, of a controlling device comprising a housing having a cylindrical chamber in one end wall thereof, a conduit connecting said chamber with said pump, a second conduit connecting said chamber with the bearings to be oiled and arranged on one side of the first mentioned conduit, a by-pass leading from said chamber at the other side of said first mentioned conduit, a plunger slidably mounted in said chamber, extending into said housing and having a circumferential groove permanently in line with the first mentioned conduit, adapted to connect said first mentioned conduit with said by-pass when said plunger is at one limit of its movement and to connect said first mentioned conduit with said second conduit when the plunger is at the other limit of its movement, a collapsible shell mounted within said housing and connected with said plunger, and a conduit connecting the interior of said collapsible shell with said intake manifold.

4. The combination with an internal combustion engine comprising a crank case, adapted to contain oil, and an intake manifold, and a pump connected with said crank case, of a controlling device comprising a housing having a cylindrical chamber in one end wall thereof, a conduit connecting said chamber with said pump, a second conduit connecting said chamber with the bearings to be oiled and arranged on one side of the first mentioned conduit, a by-pass leading from said chamber at the other side of said first mentioned conduit, a plunger slidably mounted in said chamber, extending into said housing and having a circumferential groove permanently in line with the first mentioned conduit, adapted to connect said first mentioned conduit with said by-pass when said plunger is at one limit of its movement and to connect said first mentioned conduit with said second conduit when the plunger is at the other limit of its movement, a collapsible shell having one end secured to said housing at that end thereof opposite said chamber and having its other end connected with said plunger, a screw threaded plunger mounted in the wall of said housing, extending into said collapsible shell and having a longitudinal bore, a conduit connecting the bore of said stem with said intake manifold, and a spring confined between the inner end of said stem to the bottom wall of said shell.

5. The combination with an internal combustion engine comprising a crank case adapted to contain oil, and an intake manifold, and a pump connected with said crank case, of a controlling device comprising a distributing chamber having an inlet and outlets arranged on the respective sides of said inlet, said inlet being connected with said pump, one of said outlets being connected with the bearings to be oiled and the other of said outlets being connected with a by-pass, a plunger slidably mounted in said chamber, having a groove arranged to communicate with said inlet in all positions thereof and to connect said inlet with one of said outlets when said plunger is in one position and to connect said inlet with another of said outlets when the plunger is in another position, and a suction operated device communicating with the intake manifold of said engine and connected with said plunger to impart sliding movement thereto, said controlling device further comprising an equalizing chamber interposed between said pump and said distributing chamber.

6. The combination with an internal combustion engine comprising a crank case adapted to contain oil, and an intake manifold, of a controlling device comprising a one-piece frame having a cylindrical bore constituting a pump cylinder, a piston mounted in said bore, means for actuating said piston, said frame having a passageway communicating with said cylinder, a valved conduit to connect said passageway with said crank case, said frame also having a distributing chamber, a conduit connecting said distributing chamber with the passageway leading from said pump, a by-pass leading from said distributing chamber on one side of said conduit to the crank case, a second conduit leading from said distributing chamber on the other side of said first mentioned conduit to bearings to be lubricated, a plunger slidably mounted in said distributing chamber and having a circumferential groove of such a length that it will be in communication with the first mentioned conduit in any position of said plunger, means for holding said plunger normally in a position to connect said first mentioned conduit with said by-pass, and suction operated means connected with said plunger for moving the same into a position to disconnect said first mentioned conduit from said by-pass and to connect the same to said second conduit.

In testimony whereof, I affix my signature hereto.

PAUL C. ELLIOTT.